United States Patent
Dhong et al.

[11] Patent Number: 6,038,659
[45] Date of Patent: Mar. 14, 2000

[54] METHOD FOR USING READ-ONLY MEMORY TO GENERATE CONTROLS FOR MICROPROCESSOR

[75] Inventors: Sang Hoo Dhong; Harm Peter Hofstee, both of Austin, Tex.; David Meltzer, Wapppingers Falls; Joel Abraham Silberman, Somers, both of N.Y.

[73] Assignee: International Business Machines Corporation, Armonk, N.Y.

[21] Appl. No.: 08/968,120

[22] Filed: Nov. 12, 1997

[51] Int. Cl.[7] .................................................. G06F 9/30
[52] U.S. Cl. ........................................ 712/226; 712/209
[58] Field of Search .................................... 711/103, 214, 711/219, 220, 102; 712/229, 248, 226

[56] References Cited

U.S. PATENT DOCUMENTS

| | | | |
|---|---|---|---|
| 3,786,434 | 1/1974 | Frye et al. | 340/172.5 |
| 4,011,547 | 3/1977 | Kimmel | 711/220 |
| 4,028,670 | 6/1977 | Hoffman et al. | 340/172.5 |
| 4,075,688 | 2/1978 | Lynch, Jr. et al. | 711/200 |
| 4,103,330 | 7/1978 | Thacker | 712/245 |
| 4,173,041 | 10/1979 | Dvorak et al. | 712/248 |
| 4,336,602 | 6/1982 | Kruger | 711/215 |
| 4,481,581 | 11/1984 | Johnson | 364/200 |
| 5,123,096 | 6/1992 | Matuo | 395/388 |
| 5,398,319 | 3/1995 | Sakamura et al. | 395/375 |
| 5,619,667 | 4/1997 | Henry et al. | 395/384 |
| 5,828,875 | 10/1998 | Halvarsson et al. | 712/241 |
| 5,884,059 | 3/1999 | Favor et al. | 712/215 |

*Primary Examiner*—William M. Treat
*Attorney, Agent, or Firm*—Casimer K. Salys; Jack V. Musgrove; Andrew J. Dillon

[57] ABSTRACT

A circuit for generating control signals used in a microprocessor has a storage array, such as a read-only memory (ROM) array, which contains a plurality of predefined logic patterns. An entry of the ROM array is selected, such as by the use of an address decoder, to choose a specific pattern, and the specific pattern is then modified based on a dynamic signal to generate an output control signal. The microprocessor may further predecode a base instruction using operation and operand source bits to yield a predecoded instruction having an address field whose value corresponds to the specific pattern. The dynamic signal can be based on whether an operand should be forwarded from a microprocessor component, and the specific pattern is then equivalent to a value for control signals required to execute an instruction when assuming that the operand should not be forwarded. Special control states can also be implemented, such as stall, halt, or scan data, through the use of particular code points in the ROM.

19 Claims, 4 Drawing Sheets

METHOD FOR USING READ-ONLY MEMORY TO GENERATE CONTROLS FOR MICROPROCESSOR

BACKGROUND OF THE INVENTION

1. Field of the Invention

The present invention generally relates to microprocessors, such as those used by computer systems, and more particularly to a method of generating control signals for data flow in a single chip microprocessor.

2. Description of the Related Art

Microprocessors are used in a wide variety of electronic devices, from simple accessories such as wristwatches to more complicated computer systems. A typical microprocessor operates on input binary data to produce output binary data, according to various processor instructions. Even complicated functions can be broken down into a series of these simpler instructions. In other words, a program running on the microprocessor presents two kinds of values to the microprocessor, data and instructions. These values may originate from, e.g., program files stored on a permanent (non-volatile) medium provided with the microprocessor, such as a hard disk drive in a computer system, or from a temporary (volatile) storage device such as random-access memory (RAM) which has stored new data or instructions as a result of previous program execution. The values can also originate from a read-only memory (ROM) device, such as firmware which is used to initialize (boot) a computer when power is first turned on, or from an operator input device like a keyboard.

The physical embodiment of conventionally structured microprocessors is accordingly divided into two portions, a first dataflow portion composed of, e.g., adders, shifters and operand register files, and a second control portion which generates logical signals based on the instructions, that tell the dataflow portion where to get operands, what operation to perform, where to store the result, etc. The signals generated by the control portion are coupled to the dataflow portion as multiplexor gating signals, function control gates, etc., hereinafter collectively referred to as control signals.

FIG. 1 depicts the data flow for a conventional scalar microprocessor. The microprocessor includes a PC/Branch unit 10 which is connected to the remaining components shown in FIG. 1, including an instruction cache 12, an instruction buffer register 14, a register file 16, an execution-unit 18, an execution-unit (E-unit) operand multiplexor 20, a data cache 22, a data-cache (D-cache) data multiplexor 24, and an address multiplexor 26. PC/Branch unit 10 is controlled by two control signals, a branch operand source control signal 28 and a branch unit operation control signal 30. E-unit operand multiplexor 20 is controlled by an E-unit operand source control signal 32, while D-cache data multiplexor 24 is controlled by a D-cache data source control signal 34 and address multiplexor 26 is controlled by a D-cache address source control signal 36. Execution unit 18 is controlled by an E-unit operation control signal 38, and data cache 22 is controlled by a D-cache operation control signal 40.

An address which is supplied by PC/Branch unit 10 is used to access instruction cache 12 during a first cycle (cycle 1). The instruction which is associated with the address is latched into instruction buffer register 14 at the beginning of the second cycle (cycle 2). During cycle 2, control signals must be generated for branch unit 10, and the operand source controls for the various data and address multiplexors generated. The generation of the operand source controls is complicated by the possibility of data forwarding being necessary, e.g., an operand which has just been read from D-cache 22 is needed on the same cycle as it is being written into register file 16. In such a case, the operand multiplexor must be selected to take the operand from D-cache 22 and not from register file 16. During the third cycle (cycle 3), the function controls for data cache 22 and execution unit 18 must be available. During the last cycle (cycle 4), any result is written to register file 16.

The generation of microprocessor control signals (such as the signals 28 through 40) is conventionally performed in one of two well-known ways. The most common technique uses conventional logic circuits to implement boolean equations corresponding to the control signals. These conventional logic circuits may include AND/OR/INVERT gates (or any other complete logic family such as NOR, NAND, etc.) or array logic structures such as programmable logic arrays (PLAs). An alternative technique is to generate the control signals for the microprocessor through the use of horizontal microcode routines stored in a ROM or RAM array. This latter technique is usually used only when the microprocessor executes complex instructions taking several cycles.

There are still several limitations or disadvantages with the foregoing approaches for providing control signals. Considerable space must be provided on the microprocessor chip to allow the generation of control signals for a large number of instruction code points. Additional buffers must be provided if pipelined controls are to be partitioned for loading and timing. It can also be difficult to implement special control states, such as in response to a "stall" condition wherein the microprocessor must re-execute the previous instruction. If engineering changes are required to any of the logic functions, the design methodology does not permit accurate timing estimation until the changes are completely designed since delays through the circuits are dependent on the logical equations implemented. Finally, implementation of particularly complex functions usually requires full PLA structures. It would, therefore, be desirable to provide a method of generating control signals for a microprocessor which offered greater efficiency and flexibility than either conventional logic circuits or PLAs. It would be further advantageous if the method facilitated design changes in control signal generation without affecting timing estimation.

SUMMARY OF THE INVENTION

It is therefore one object of the present invention to provide an improved microprocessor.

It is another object of the present invention to provide such an improved microprocessor which offers more flexible generation of instruction-related control signals.

It is yet another object of the present invention to provide such an improved microprocessor which efficiently supports a large number of unique instructions.

The foregoing objects are achieved in a circuit for generating control signals for use in a microprocessor, generally comprising a storage array containing a plurality of predefined logic patterns, means for selecting an entry of the storage array to choose a specific pattern, and means for modifying the specific pattern based on a dynamic signal to generate an output control signal. In a preferred embodiment, the storage array is a read-only memory (ROM) array. The microprocessor may further include means for predecoding a base instruction using operation and operand source bits in the base instruction to yield a predecoded instruction having an address field whose value corresponds to the specific pattern. The selecting means may include a decoder circuit, such as a 6-to-64 decoder. In a further embodiment, one of the predefined patterns is all zeroes and corresponds to a non-operation, and can be used to indicate a stall condition wherein a previous instruction should be reexecuted. The dynamic signal which is used to modify the specific pattern can be based on whether an operand should be forwarded from a microprocessor component; the specific pattern is then equivalent to a value for control signals required to execute an instruction when assuming that the operand should not be forwarded. The specific pattern can be modified by the dynamic signal using a plurality of gates each having a first input connected to a respective bit in the storage array entry and a second input connected to a respective bit in the dynamic signal, wherein the output control signal corresponds to outputs of the gates. The gates can be, e.g., AND gates.

The present invention permits the use of small ROMs to generate a plurality of control signals over several cycles, and partitioning of the values stored in the ROMs so that a ROM can generate control signals for more instruction code points than the addressable space of the single ROM. The design methodology further simplifies timing estimation since the delay through the ROM is independent of the pattern stored. Implementation of complex functions is achieved without the need for full PLA structures. Special control states can also be implemented, such as stall, halt, or scan data, through the use of particular code points in the ROM.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
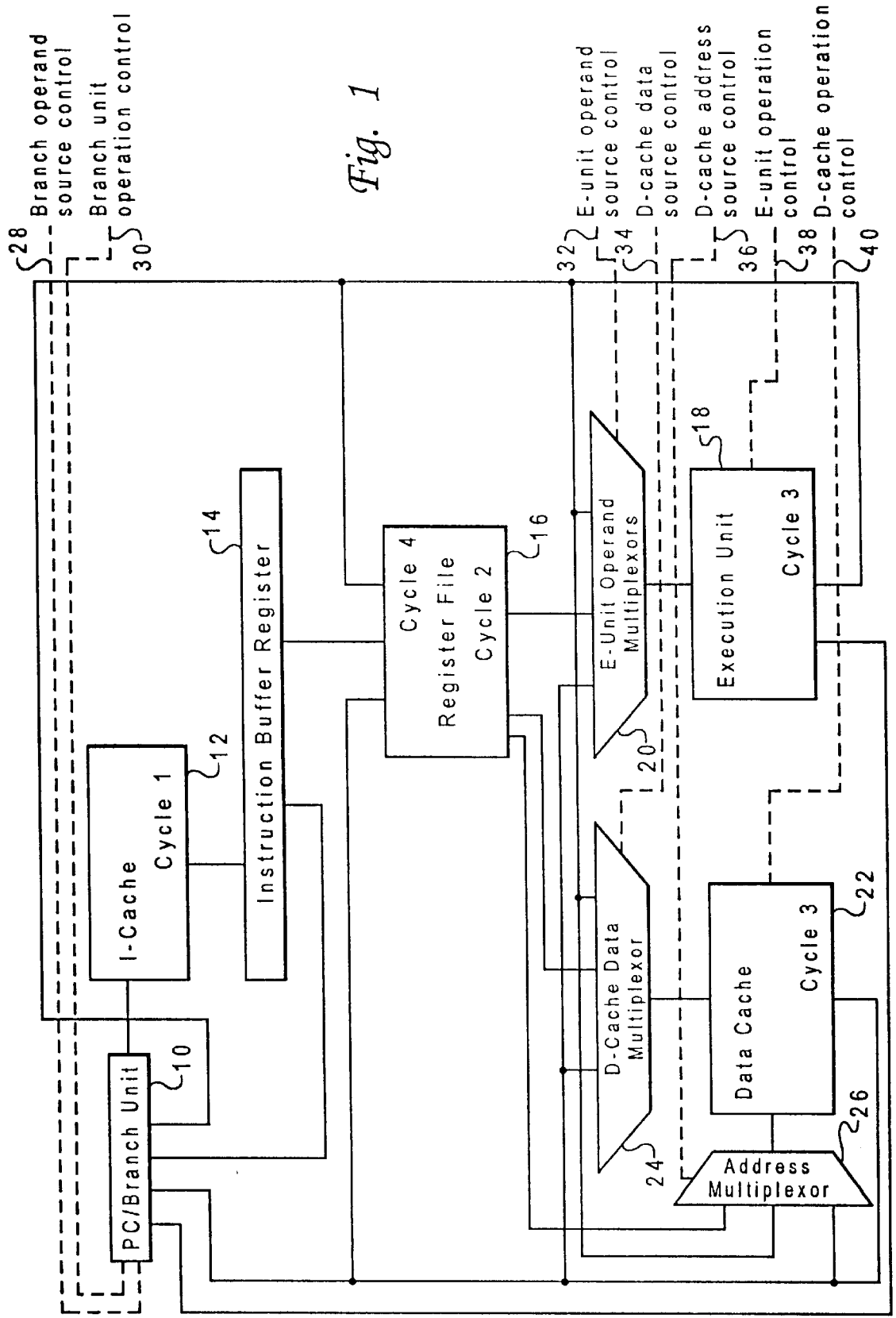
FIG. 1 is a block diagram illustrating the data flow portion of a conventional scalar microprocessor.
Figure 2:
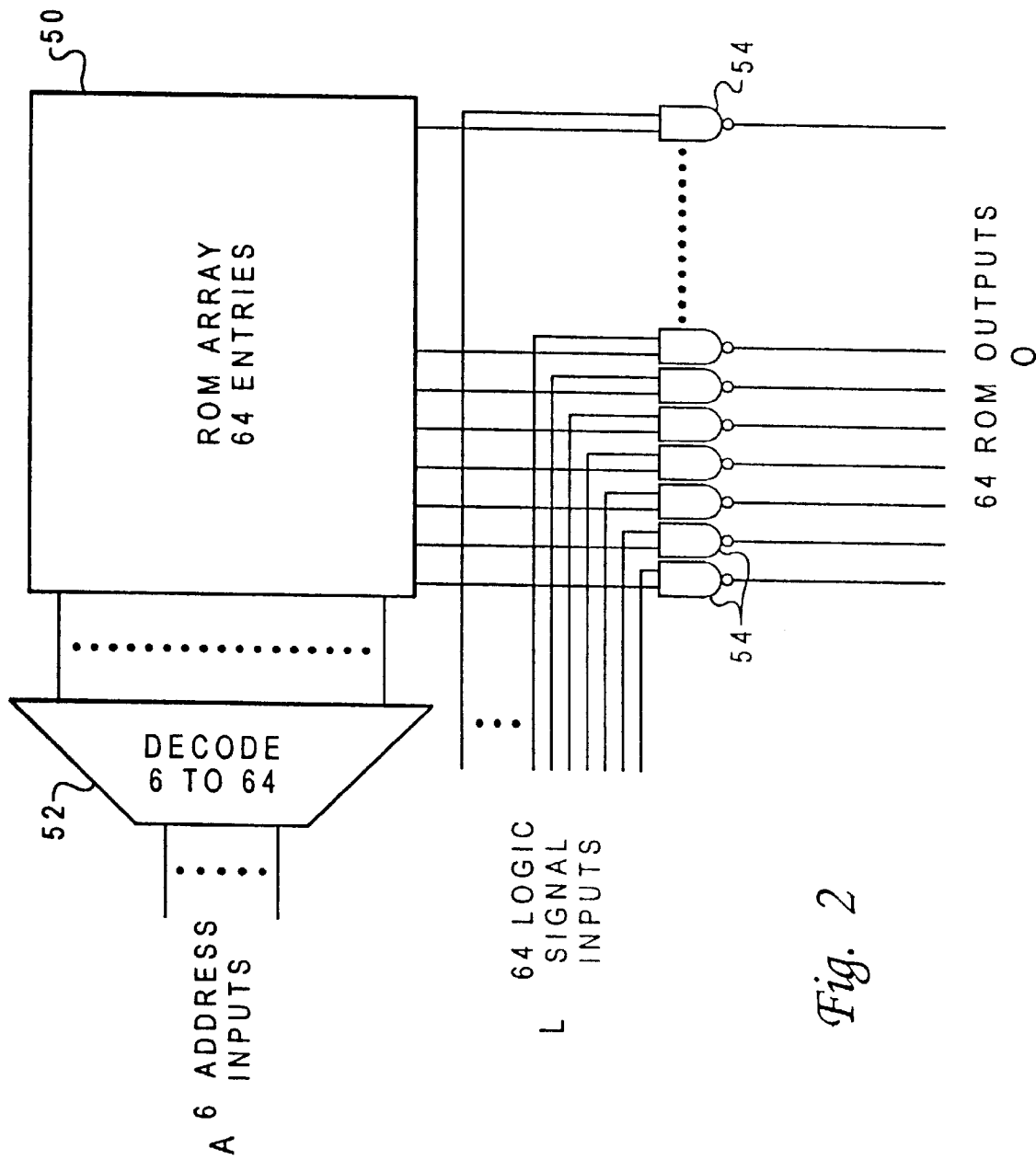
FIG. 2 is a schematic diagram illustrating one implementation of the present invention wherein a read-only memory (ROM) structure is used to generate control signals for the microprocessor from static patterns in the ROM modified by a dynamically generated signal.

With reference now to the figures, and in particular with reference to FIG. 2, there is depicted one implementation of the method of the present invention for generating control signals in a microprocessor, particularly a microprocessor adapted for use in a computer system. A read-only memory (ROM) structure is used to generate the control signals based on static, predefined patterns which are stored in a ROM array 50 and are modified by a dynamically generated signal L. A particular static pattern can be chosen by providing an encoded address signal A which is fed to a decoder 52 and used to select one of the entries in ROM 50.

The selected pattern in ROM 50 can be combined with the logic control signal L in nearly any logical fashion (e.g., AND, OR, NAND, NOR or XOR). In the depicted implementation, the modification of the static pattern is achieved using an array of two-input AND gates 54, each gate 54 having one input from a respective one of the bits in logic control signal L and having the other input from a respective one of the bits in the selected entry of ROM 50. The output O of this signal generator (i.e., the outputs of gates 54) provides control signals to the various components of the microprocessor, for example, regarding the decision as to whether an operand must be forwarded or not.

In the depicted implementation, ROM 50 is a 64 entry array, so six bits are required for the ROM address, and a 6-to-64 decoder is used for decoder 52. Alternative means could be provided to select a specified entry in ROM 50. The design also provides a 64-bit output signal O, so each entry in ROM 50 is 64 bits, and logic control signal L is similarly 64 bits. These values are exemplary, and could vary according to design criteria, but this size of an output control signal is deemed adequate for most applications.

Figure 3:
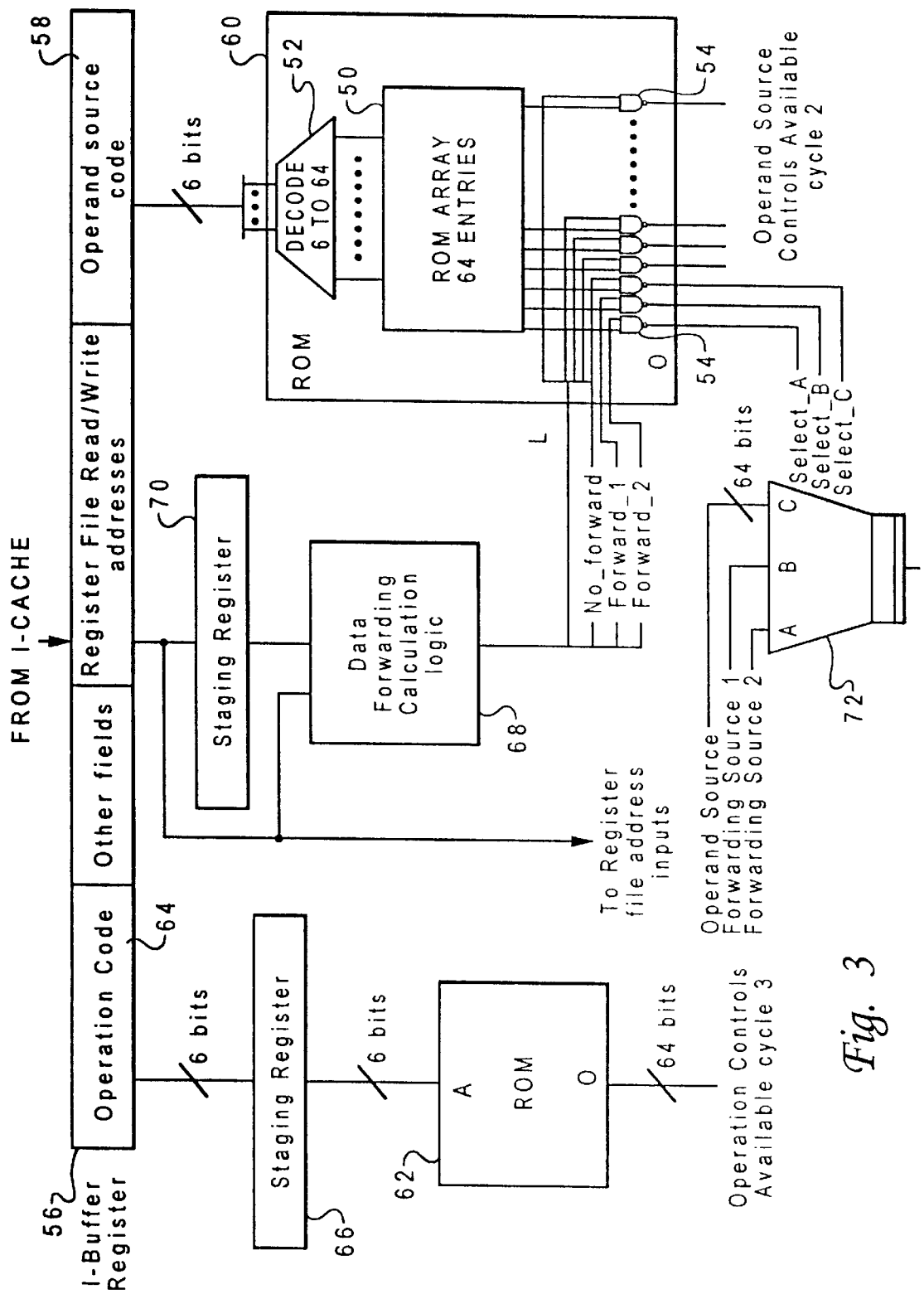
FIG. 3 is a block diagram illustrating handling of an instruction to generate control signals according to one implementation of the present invention.

The generation of microprocessor control signals according to the present invention can be further understood with reference to FIG. 3, which illustrates a preferred method for handling an instruction that results in generation of control signals. An instruction is first loaded from an instruction cache into an instruction-buffer (I-buffer) register 56. In this implementation, the instruction format is different from that specified by the instruction set architecture (ISA) standards, so any base instructions provided according to ISA standards must be modified during predecode cycles taken when the contents of the instruction cache are written. Predecode techniques are generally known. The predecode algorithm used herein uses all the operation and operand source bits in an instruction and performs the following steps: (i) decomposes each code point in the instruction operation/operand space into a unique pattern of bits equivalent to the value of the control signals needed to execute the instruction when assuming no forwarding of data; (ii) groups these bits by the cycle in which they are needed, e.g., operand sources needed on cycle 2, operand sources needed on cycle 3; (iii) assigns a coded 6-bit value to each unique combination of bits within each group; and (iv) stores these values in fields in the predecoded instruction in the instruction cache.

The 6-bit operand source code 58 assigned to each unique value becomes the address of the data pattern stored in ROM 50 which is equal to the value. The control signal generator 60 (comprised of decoder 52, ROM array 50 and gates 54) generates the operand source controls and branching controls needed in the second cycle, and is fed by the operand source field 58 of the predecoded instruction. Another ROM structure 62 produces all operation controls needed in the third cycle, and is addressed by an operation code field 64 of the predecoded instruction (staged by one cycle through a staging register 66).

The operand source part of the controls generated by control signal generator 60 must be modified dynamically by the results of a data forwarding calculation circuit 68 which determines if the source of an operand is a register file, an execution unit, or a data cache. This calculation is accomplished by comparing the value of a register file address to be read with an address of a register file to be written in the previous instruction, as saved in another staging register 70.

Any operand selection multiplexors, such as the exemplary 64-bit multiplexor 72 shown in FIG. 3, has a unique selection signal per input. For a 3-input multiplexor which must be selected among 6-bit input busses A, B or C, there are three input selection lines, SELECT_A, SELECT_B, SELECT_C. The dynamic forwarding calculation is combined with the static decoding of the operand source by assigning a unique ROM array bit to each of the select signals and putting the identical value in each of the array bits assigned to the three selects. The forwarding calculation logic generates three logical values corresponding to use of the normal operand source, the first forwarding source, or the second forwarding source (No_forward, Forward_1, Forward_2). These signals are used as one input to each of three AND gates 54 whose outputs are connected to the respective select inputs of multiplexor 72. It can be seen that this generates the correct logical values for each of the select inputs and so properly selects among the three data sources which are input to the multiplexor.

Those skilled in the art will appreciate that, if one of the operand and operation selection patterns stored in the ROMs is all zeroes, then the instruction with these coded values in the cycle 1 and cycle 2 control fields becomes a no-op (non-operation). Therefore, the addition of a HOLD value to the multiplexor and the addition of a corresponding control signal would allow the creation of a STALL condition where the previous instruction was reexecuted. Similar special control signals can be easily created by a combination of multiplexor controls and ROM values.

Figure 4:
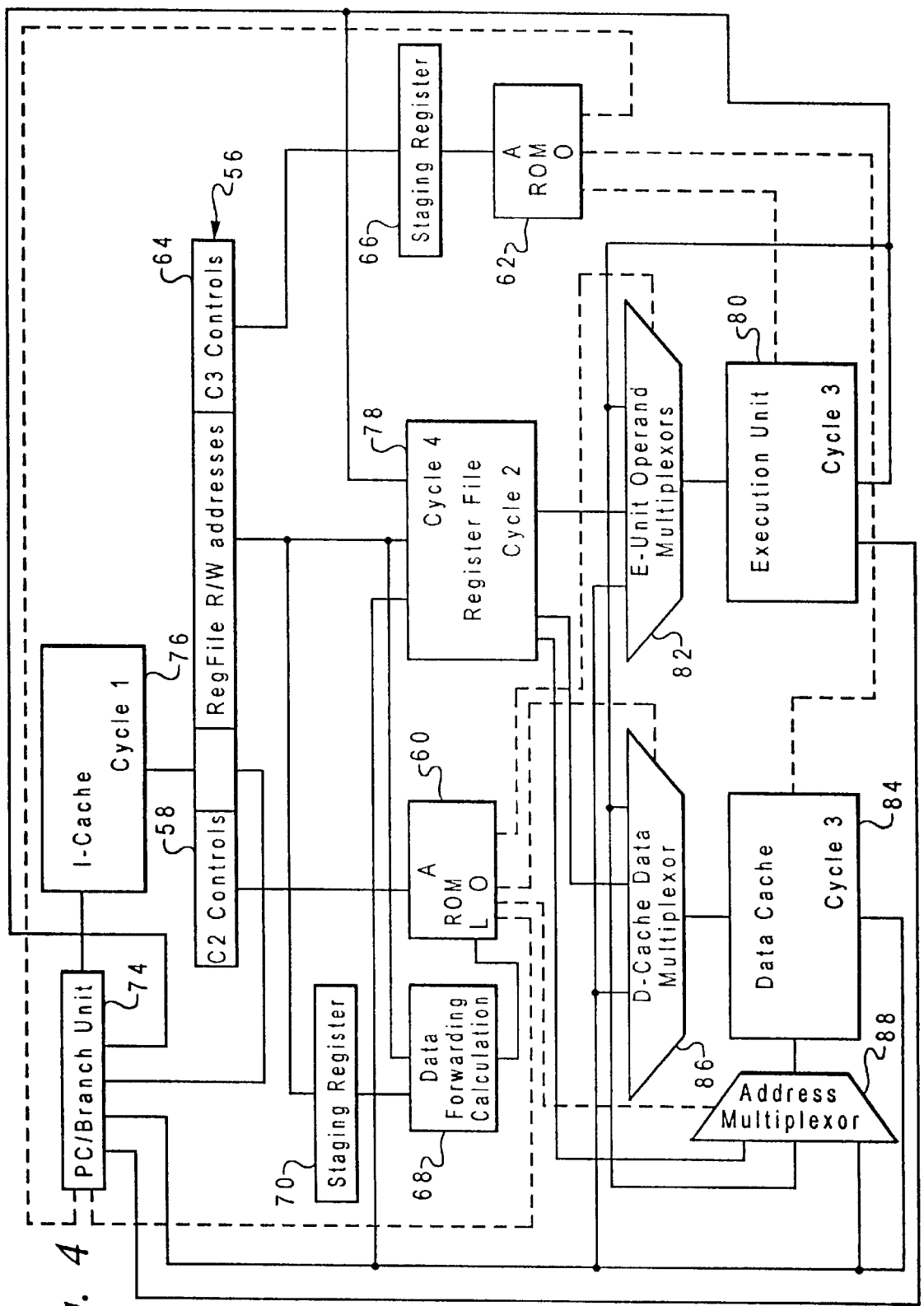
FIG. 4 is a block diagram illustrating one embodiment of a scalar microprocessor constructed in accordance with the present invention, and particularly with the instruction handling implementation of FIG. 3.

FIG. 4 is a block diagram illustrating additional features of a scalar microprocessor incorporating the foregoing designs. A PC/Branch unit 74 supplies an address to an instruction cache 76 during the first cycle. The predecoded instruction which is associated with the address is latched into I-buffer register 56 at the beginning of the second cycle. During the second cycle, control signals are provided (via control signal generator 60) to a register file 78, an execution-unit 80, an execution-unit (E-unit) operand multiplexor 82, a data cache 84, a data-cache (D-cache) data multiplexor 86, and an address multiplexor 88. During the third cycle, control signals are provided to these components via ROM structure 62.

Use of the predecoded instruction format and the separate ROM structures 60 and 62 for operation and operand source allows, e.g., 64-entry ROMs to support more than 64 unique instructions. One code point in the operand source ROM structure 60 could support two or more operation code points and conversely one code point in the operation ROM structure 62 could support two or more operand source ROM code points. For example, ISA supports many operations where the operand sources come from the register file and the result is written back to the register file. One operand source ROM location, corresponding to two register file sources, can thus support two operation ROM locations, e.g., ADD and SUBTRACT. In this way, 64-entry ROMs support an instruction set of up to 96 instructions. In addition, the AND gate which is the final stage of the control signal generator 60 also serves as a buffer to drive the wire and logic loads.

As noted above, a microprocessor constructed in accordance with the present invention may be particularly adapted for use in, e.g., a personal computer. In such a case, it is understood that the microprocessor may include many conventional components not shown in FIG. 4. Such details may vary depending on the objectives influencing the design.

Use of a storage array such as read-only memory to generate control signals according to the method of this invention imparts several advantages. It permits use of small ROMs to generate a plurality of control signals over several cycles, and most particularly a partitioning of the values stored in the ROMs so that a ROM can generate control signals for more instruction code points than the addressable space of the single ROM. Pipeline controls can be partitioned for loading and timing without the use of additional buffers. This invention presents a design methodology permitting accurate timing estimation which is independent of any engineering changes needed in the logic functions, since the delay through the ROM is independent of the pattern stored. Implementation of complex functions is greatly simplified by combining static logic patterns with dynamically generated signals without the need for full PLA structures. Special control states can also be implemented, such as stall, halt, or scan data, through the use of particular code points in the ROM.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A circuit for generating control signals for use in a microprocessor, the circuit comprising:

a storage array containing a plurality of predefined logic patterns;

means for selecting an entry of said storage array to choose a specific pattern;

means for generating a dynamic signal based on whether an operand should be forwarded from a microprocessor component; and means for modifying said specific pattern based on said dynamic signal to generate an output control signal.

2. The circuit of claim 1 wherein said storage array is a read-only memory array.

3. A microprocessor using the circuit of claim 1, wherein said microprocessor includes means for predecoding a base instruction using operation and operand source bits in the base instruction to yield a predecoded instruction having an address field whose value corresponds to said specific pattern.

4. The circuit of claim 1 wherein said selecting means includes a decoder circuit.

5. The circuit of claim 1 wherein one of said predefined patterns is all zeroes and corresponds to a non-operation.

6. The circuit of claim 1 wherein:

said modifying means includes a plurality of gates each having a first input connected to a respective bit in said storage array entry and a second input connected to a respective bit in the dynamic signal; and said output control signal corresponds to outputs of said gates.

7. The circuit of claim 1 wherein said specific pattern is equivalent to a value for control signals required to execute an instruction when assuming that the operand should not be forwarded.

8. The circuit of claim 6 wherein said gates are AND gates.

9. A microprocessor comprising:

at least one execution unit;

means for providing a data value to said execution unit;

means for generating a dynamic signal based on whether an operand should be forwarded from a microprocessor component; and means for generating control signals for said execution unit and said means for providing a data value to said execution unit, including a storage array containing a plurality of predefined logic patterns, means for selecting an entry of said storage array to choose a specific pattern, and means for modifying said specific pattern based on said dynamic signal to generate an output control signal, wherein said specific pattern is equivalent to a value for control signals required to execute an instruction when assuming that the operand should not be forwarded.

10. The microprocessor of claim 9 wherein said means for providing a data value to said execution unit includes a data cache.

11. The microprocessor of claim 9 further comprising means for predecoding a base instruction using operation and operand source bits in the base instruction to yield a predecoded instruction having an address field whose value corresponds to said specific pattern.

12. The microprocessor of claim 9 further comprising means for generating a second set of control signals.

13. The microprocessor of claim 9 wherein one of said predefined patterns is all zeroes and corresponds to a non-operation.

14. A method of generating control signals for a microprocessor, comprising the steps of:

providing a storage array in the microprocessor having a plurality of predefined logic patterns;

selecting an entry in the storage array to choose a specific pattern from among the plurality of predefined logic patterns;

generating a dynamic signal based on whether an operand should be forwarded from a microprocessor component; and modifying the specific pattern based on the dynamic signal to generate an output control signal.

15. The method of claim 14 further comprising the step of predecoding a base instruction using operation and operand source bits in the base instruction to yield a predecoded instruction having an address field whose value corresponds to the specific pattern.

16. The method of claim 14 wherein the specific pattern is composed entirely of zeroes and corresponds to a non-operation, and further comprising the step of issuing a corresponding control signal for the non-operation indicating a stall condition wherein a previous instruction should be reexecuted.

17. The method of claim 14 wherein said modifying step includes the step of combining the specific pattern with the dynamic signal according to a logical AND operation to generate the output control signal.

18. The method of claim 15 wherein said selecting step includes the step of decoding an address value in the address field.

19. The method of claim 14 wherein said providing step includes the step of storing the specific pattern using a series of bit values which are equivalent to control signals required to execute an instruction when assuming that the operand should not be forwarded.

* * * * *